United States Patent
Tsumiyama et al.

(10) Patent No.: US 10,493,892 B2
(45) Date of Patent: Dec. 3, 2019

(54) UTILITY VEHICLE

(71) Applicant: KAWASAKI JUKOGYO KABUSHIKI KAISHA, Hyogo (JP)

(72) Inventors: Yoshinori Tsumiyama, Miki (JP); Teruaki Yamamoto, Himeji (JP)

(73) Assignee: KAWASAKI JUKOGYO KABUSHIKI KAISHA, Hyogo (JP)

(*) Notice: Subject to any disclaimer, the term of this patent is extended or adjusted under 35 U.S.C. 154(b) by 194 days.

(21) Appl. No.: 15/393,393

(22) Filed: Dec. 29, 2016

(65) Prior Publication Data
US 2018/0186270 A1   Jul. 5, 2018

(51) Int. Cl.
*B60P 1/28* (2006.01)
*B62D 33/02* (2006.01)

(52) U.S. Cl.
CPC .............. *B60P 1/28* (2013.01); *B62D 33/02* (2013.01); *B60Y 2200/20* (2013.01)

(58) Field of Classification Search
CPC .................. B60P 1/04; B60P 1/16; B60P 1/28
USPC ................................................ 296/183.2, 1
See application file for complete search history.

(56) References Cited

U.S. PATENT DOCUMENTS

| 5,086,858 | A  | * | 2/1992  | Mizuta ................... | B60K 11/06 |
|           |    |   |         |                           | 123/41.56 |
| 6,394,555 | B2 | * | 5/2002  | Mizuta ................. | B62D 31/003 |
|           |    |   |         |                           | 296/183.2 |
| 7,168,767 | B2 | * | 1/2007  | Linares ..................... | B60P 1/28 |
|           |    |   |         |                           | 298/1 A |
| 9,108,559 | B1 | * | 8/2015  | Tsumiyama .............. | B60P 1/24 |
| 9,187,023 | B2 |   | 11/2015 | Takahashi et al.          |           |
| 9,604,561 | B2 | * | 3/2017  | Maeda .................... | B60R 21/13 |
| 2014/0183894 | A1 | * | 7/2014 | Yamamoto ............. | B60P 3/423 |
|           |    |   |         |                           | 296/24.43 |

* cited by examiner

*Primary Examiner* — D Glenn Dayoan
*Assistant Examiner* — Sunsurraye Westbrook
(74) *Attorney, Agent, or Firm* — Wenderoth, Lind & Ponack, L.L.P.

(57) ABSTRACT

An utility vehicle includes a chassis; a ROPS that surrounds a riding space; a cargo bed that is disposed behind the riding space and is pivotably supported by a pivot of the chassis so as to be movable up and down between a normal position at which a front portion of the cargo bed is not lifted and is supported on the chassis and a dumping position at which the front portion of the cargo bed is lifted; and a pair of left and right cargo bed support portions that are attached to the ROPS, extend backward, and support side portions of the front portion of the cargo bed at the normal position from below.

4 Claims, 6 Drawing Sheets

UTILITY VEHICLE

BACKGROUND OF THE INVENTION

Technical Field

The present invention relates to a utility vehicle. More specifically, the present invention relates to a utility vehicle having a cargo bed that is configured to be capable of performing a dumping action.

Related Art

U.S. Pat. No. 9,187,023 discloses a utility vehicle having, behind a riding space, a cargo bed that is capable of performing a dumping action. In this utility vehicle, the cargo bed is configured such that a rear portion thereof is pivotably supported by a chassis via a pivot shaft and a front portion thereof is movable up and down between a dumping position, at which the front portion is lifted, and a normal position, which is a non-lifted state. At the normal position, the cargo bed is supported from below by the chassis, and the front portion thereof is fixed to the chassis by a cargo bed locking mechanism.

SUMMARY

The chassis has a pair of left and right main frames extending in a front-rear direction between left and right rear wheels, and the cargo bed at the normal position is supported on the main frames. The cargo bed is provided across the width of the utility vehicle and is wider than the pair of left and right main frames. Accordingly, at the normal position, a central portion of the cargo bed in the vehicle width direction is supported by the main frames, but both side portions of the cargo bed in the vehicle width direction protrude from the main frames so as to be supported at only one ends thereof. Furthermore, the side portions of the cargo bed in the vehicle width direction are pulled downward by the cargo bed locking mechanism. For this reason, the side portions of the cargo bed in the vehicle width direction tends to be deformed downward.

In view of this, a conventional cargo bed reduces downward deformation of side portions thereof in the vehicle width direction by increasing rigidity of a lateral member extending in the vehicle width direction among members that constitute a bottom frame of the cargo bed. However, in order to increase the rigidity of the lateral member, it is, for example, necessary to increase the plate thickness of the lateral member, increase the number of lateral members, or increase the size of a cross-sectional shape of the lateral member. This invites an increase of the weight of the cargo bed.

The present invention was accomplished in view of the above problems, and an object of the present invention is to provide a utility vehicle in which rigidity, in a vehicle width direction, of a cargo bed at a normal position can be improved while keeping an increase of the weight of the cargo bed small.

In order to achieve the object mentioned above, the present invention provides an utility vehicle including a chassis; a ROPS that surrounds a riding space; a cargo bed that is disposed behind the riding space and is pivotably supported by a pivot of the chassis so as to be movable up and down between a normal position at which a front portion of the cargo bed is not lifted and is supported on the chassis and a dumping position at which the front portion of the cargo bed is lifted; and a pair of left and right cargo bed support portions that are attached to the ROPS, extend backward, and support side portions of the front portion of the cargo bed at the normal position from below.

According to the present invention, not only the cargo bed at the normal position is supported by the chassis, but also the left and right side portion of the front portion thereof are supported by the pair of left and right cargo bed support portions. This makes support rigidity of the cargo bed at the normal position in the vehicle width direction higher than that in a case where the cargo bed is supported only by the chassis. Furthermore, the rigidity of the cargo bed support portions is high since the cargo bed support portions are attached to the ROPS having high rigidity. This further improves the support rigidity of the cargo bed. It is therefore possible to improve the rigidity of the cargo bed at the normal position without increasing the rigidity of the cargo bed itself in the left-right direction. As a result, it is possible to improve the rigidity of the cargo bed at the normal position, especially the rigidity of the cargo bed in the vehicle width direction while keeping an increase of the weight of the cargo bed small.

The utility vehicle preferably has any of the following configurations.

(1) The ROPS has a pair of upper and lower cross members that extend in a vehicle width direction behind the riding space, and the cargo bed support portions are attached to and across the pair of upper and lower cross members.

According to the configuration (1), the cargo bed support portions can be configured to easily bear load in the top-bottom direction. This further improves the support rigidity of the cargo bed at the normal position in the left-right direction.

(2) The utility vehicle further includes a cargo bed locking unit that fixes the cargo bed at the normal position to the chassis, the cargo bed locking unit having a hook receiver that is provided on the side portions of the cargo bed and a hook that is provided on the chassis and is configured to be capable of being locked to the hook receiver, and at least part of the cargo bed locking unit overlapping the cargo bed support portions when viewed from a side face of the utility vehicle.

According to the configuration (2), load of locking of the hook and the hook receiver is supported by cargo bed support portions in a case where the cargo bed is locked at the normal position by the cargo bed locking unit. This makes it possible to firmly fix the cargo bed at the normal position while keeping deformation of the cargo bed caused by the load of locking small.

(3) The utility vehicle has the configuration (2), and the cargo bed locking unit is provided on each of the left and right side portions.

According to the configuration (3), the cargo bed can be fixed at the normal position in a well-balanced manner in the left-right direction.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

A utility vehicle 1 according to an embodiment of the present invention will now be described below with reference to the accompanying drawings. For convenience of description, it is assumed that a direction toward which the utility vehicle 1 travels is a "front side" of the utility vehicle 1 and parts thereof and that left and right of a driver in a vehicle width direction are "left and right" of the utility vehicle 1 and the parts thereof.

Figure 1:
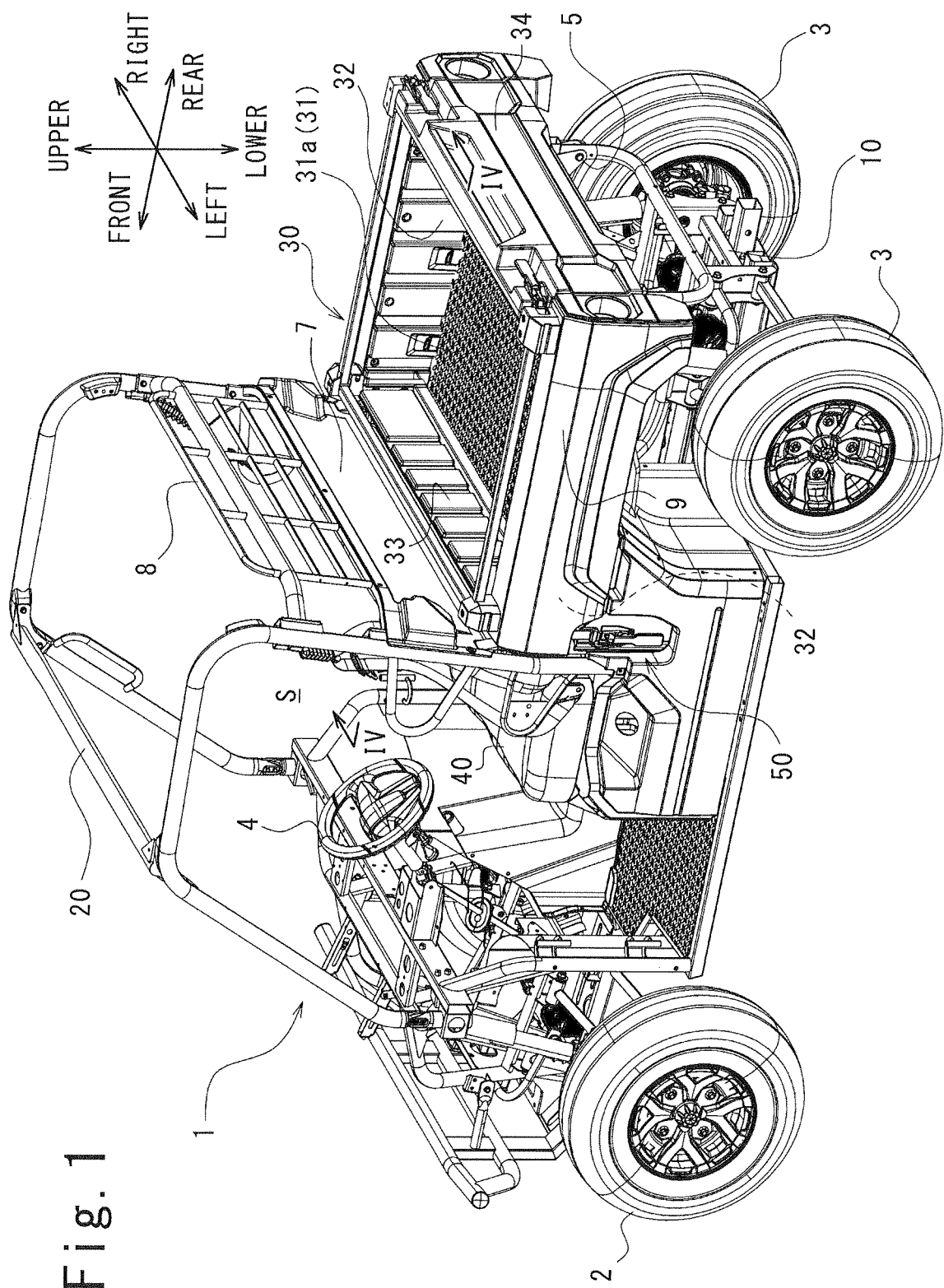
FIG. 1 is a perspective view of a utility vehicle according to an embodiment of the present invention.

FIG. 1 is a perspective view of the utility vehicle 1 according to the embodiment of the present invention viewed from a left rear side. In FIG. 1, exterior constituent members (e.g., bonnet and fender), a dashboard, and the like in a front portion of the vehicle are omitted. As illustrated in FIG. 1, the utility vehicle 1 includes a chassis 10 that constitutes a frame part, a pair of left and right front wheels 2 and a pair of left and right rear wheels 3 that are disposed at a front end and a rear end of the chassis 10, respectively, a riding space S that is provided between the front wheels 2 and the rear wheels 3 and is surrounded by a ROPS 20, and a cargo bed 30 that is provided behind the riding space S on an upper side of the chassis 10.

In the riding space S, a bench-type seat 40 is disposed, and a steering wheel 4 is disposed in front of the seat 40. A rear cover 7 that covers the seat 40 from behind is attached to a rear portion of the ROPS 20, and a grid-like screen 8 is attached above the rear cover 7. The ROPS is an abbreviation of a rollover protective structure.

The cargo bed 30 has a bottom wall portion 31 that has a substantially rectangular shape in plan view and on which a cargo is placed, a pair of left and right side wall portions 32 that rise upward from side portions of the bottom wall portion 31 in the vehicle width direction, and a front wall portion 33 that rises upward from a front end of the bottom wall portion 31. A rear wall portion 34 is provided at a rear end of the bottom wall portion 31, and a lower end of the rear wall portion 34 is pivotably supported by the pair of left and right side wall portions 32. The rear wall portion 34 is configured as a gate-type panel that is movable between a closed position at which the rear wall portion 34 rises substantially vertically and an opened position at which the rear wall portion 34 hangs down from the bottom wall portion 31. A side cover 9 that covers the pair of left and right side wall portions 32 from outer sides thereof in the vehicle width direction is attached onto each of the pair of left and right side wall portions 32. The side cover 9 extends substantially horizontally in an anteroposterior direction. The side cover 9 extends downward from the cargo bed 30 to a position above the rear wheels 3 located below the cargo bed 30 and therefore also functions as a rear fender.

Figure 2:
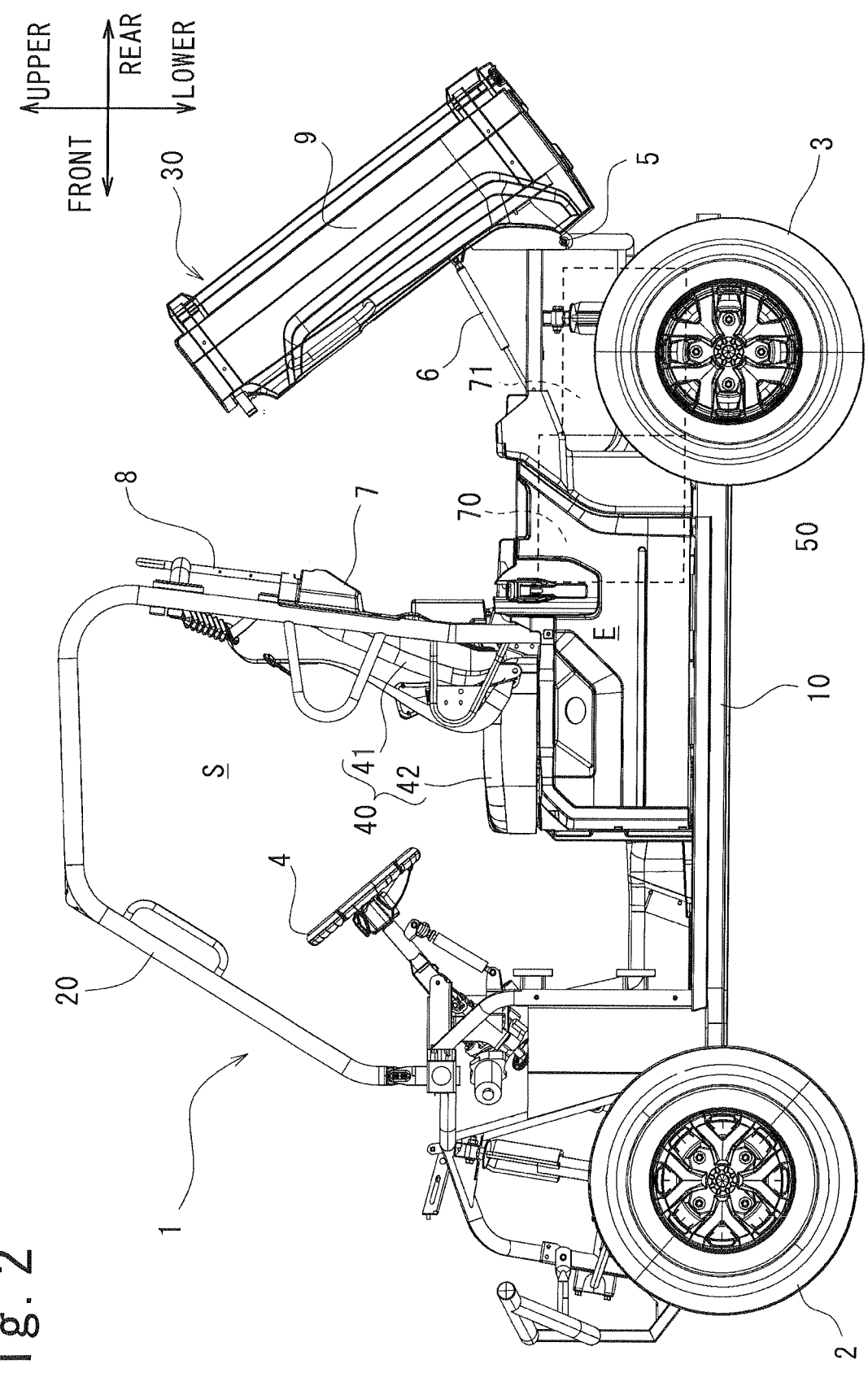
FIG. 2 is a left side view of the utility vehicle in a state where a cargo bed is at a dumping position.

FIG. 2 is a left side view of the utility vehicle 1 and illustrates a state where the cargo bed 30 is at a dumping position. As illustrated in FIG. 2, the cargo bed 30 is configured such that a rear portion thereof is pivotably supported by a rear end of the chassis 10 via a pivot shaft 5 and a front portion thereof is movable up and down between a dumping position, at which the front portion is lifted, and a normal position, which is a non-lifted state. An engine room E in which power units such as an engine 70 and a transmission 71 are installed is provided in the chassis 10 located below the cargo bed 30 at the normal position.

A dumper 6 (gas cylinder) is provided between the chassis 10 and the cargo bed 30. The dumper 6 is for assisting the dumping action of the cargo bed 30. The dumper 6 assists turning (upward movement) of the cargo bed 30 from the normal position to the dumping position and makes turning (downward movement) of the cargo bed 30 from the dumping position to the normal position gradual.

Figure 3:
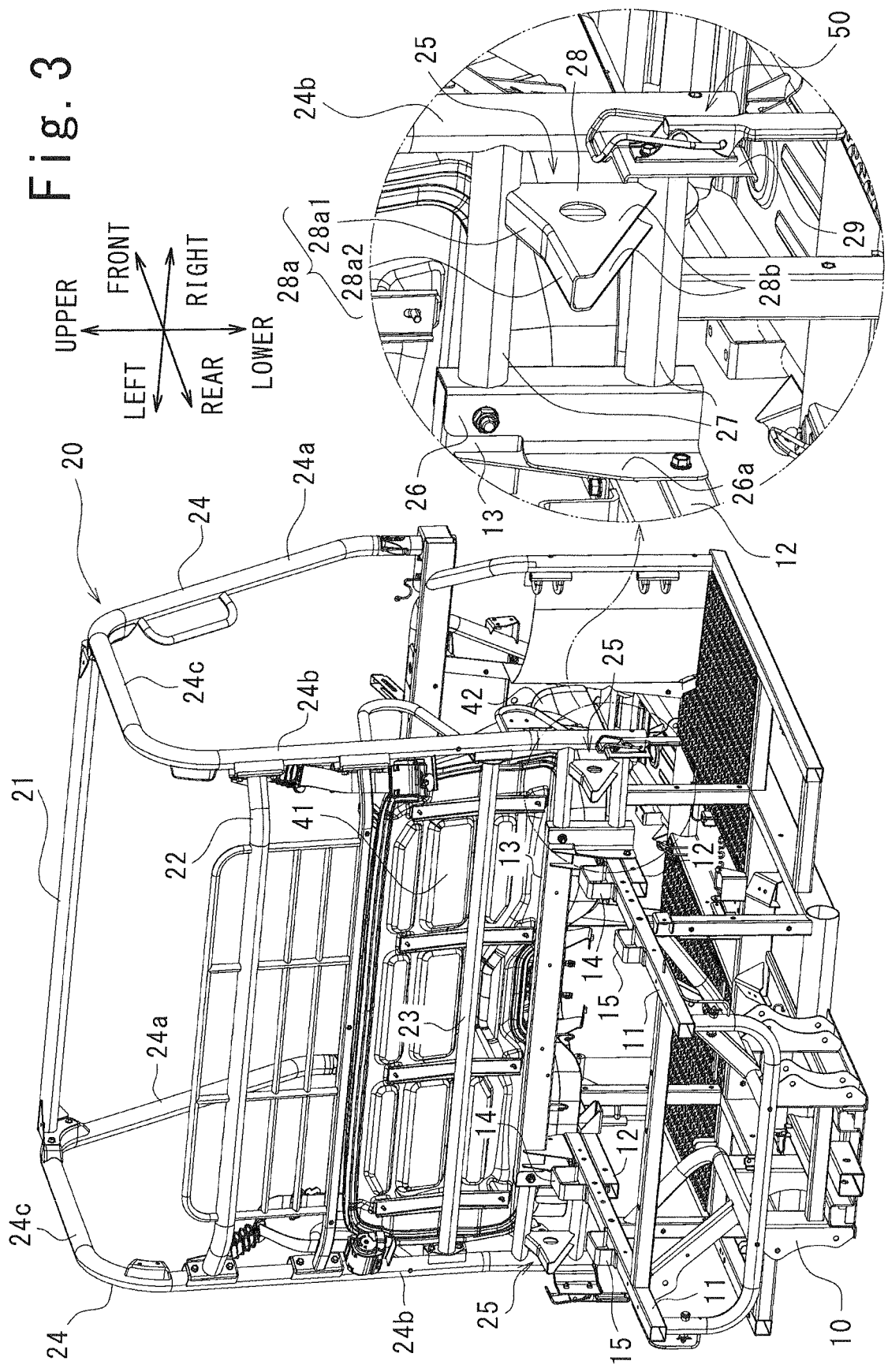
FIG. 3 is a perspective view of a chassis.

FIG. 3 is a perspective view of the chassis 10 viewed from a right rear side. In FIG. 3, the ROPS 20 and the seat 40 are also illustrated. As illustrated in FIG. 3, the ROPS 20 has a pair of left and right side units 24 made of a metal pipe and first to third cross members 21 to 23 that couple the side units 24 and are made of a metal pipe.

Each of the side units 24 integrally includes a front pole portion 24a that extends in a top-bottom direction on a front side, a rear pole portion 24b that extends in the top-bottom direction on a rear side, and an upper beam portion 24c that extends in the front-rear direction and connects upper ends of the front pole portion 24a and the rear pole portion 24b. The front pole portion 24a, the rear pole portion 24b, and the upper beam portion 24c each are formed by bending a pipe member having a circular cross section into a substantially U shape in side view. The rear pole portion 24b is disposed at a position substantially corresponding to a seat back 41 of the seat 40 in the front-rear direction (see also FIG. 2).

The first cross member 21 connects front portions of the left and right upper beam portions 24c in the vehicle width direction. The second cross member 22 connects upper portions of the left and right rear pole portions 24b in the vehicle width direction. The third cross member 23 connects intermediate portions, in the top-bottom direction, of the left and right rear pole portions 24b in the vehicle width direction, and the seat back 41 of the seat 40 is attached to a front side of the third cross member 23.

The chassis 10 has a pair of left and right main frames 11 that extend backward behind the seat 40, a pair of left and right seat frames 12 that are joined to front lower portions of the main frames 11 and extend forward, and a ROPS mount 13 that extends in the vehicle width direction between the pair of left and right main frames 11 and is suspended above the main frames 11 across the main frames 11. The main frames 11 are located between the pair of left and right rear wheels 3 (see FIG. 1) in the vehicle width direction. A seat cushion 42 of the seat 40 is supported on upper portions of the seat frames 12.

A first cargo bed support bracket 14 and a second cargo bed support bracket 15 for supporting the cargo bed 30 at the normal position from below are provided on an upper portion of each of the pair of left and right main frames 11. The first cargo bed support bracket 14 is provided close to a rear side of the ROPS mount 13. The second cargo bed support bracket 15 is provided behind the first cargo bed support bracket 14 so as to be located on a substantially central portion, in the front-rear direction, of each of the main frames 11.

Figure 4:
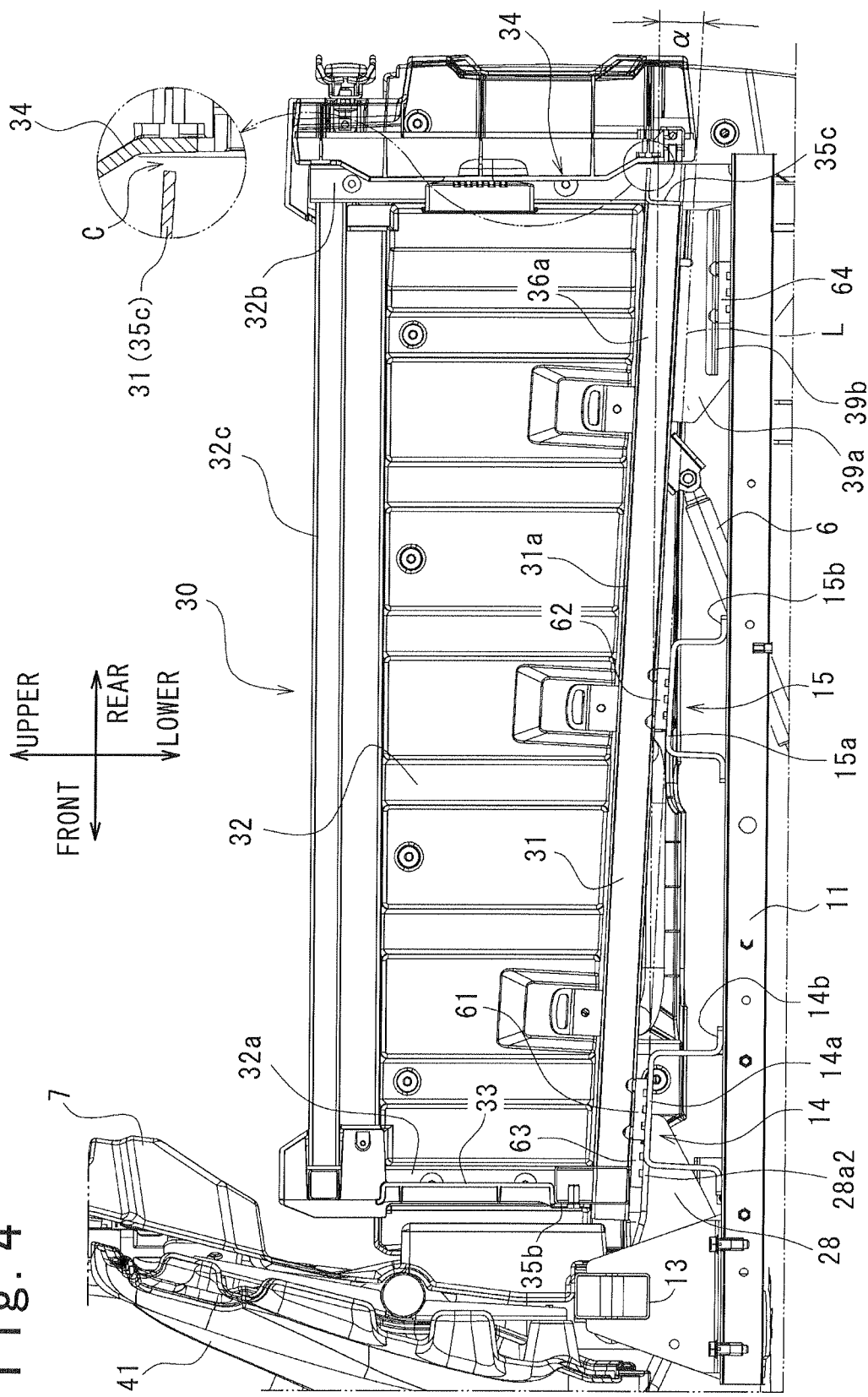
FIG. 4 is a front-rear direction cross-sectional view of the cargo bed taken along line IV-IV of FIG. 1.

FIG. 4 is a longitudinal cross-sectional view taken along line IV-IV of FIG. 1 and illustrates the cargo bed 30 at the normal position and surroundings thereof. As illustrated in FIG. 4, each of the first and second cargo bed support brackets 14 and 15 has a hat-shaped cross section that is opened on a lower side thereof when viewed from a side face of the vehicle. The first and second cargo bed support brackets 14 and 15 have, at upper ends thereof, upper surface portions 14a and 15a that extend in the front-rear direction, respectively, and on which the cargo bed 30 is supported and have, at lower ends thereof, flange portions 14*b* and 15*b* that extend in the front-rear direction, respectively, and by which the first and second cargo bed support brackets 14 and 15 are fixed to the upper surface of each of the main frames 11 by welding.

The first and second cargo bed support brackets 14 and 15 are formed so that the upper surface portions 14*a* and 15*a* are inclined downward toward the rear side, respectively. More specifically, the upper surface portion 15*a* of the second cargo bed support bracket 15 is located on a virtual plane L extended in the front-rear direction and the vehicle width direction from the upper surface portion 14*a* of the first cargo bed support bracket 14. That is, the first cargo bed support bracket 14 is higher in height in the top-bottom direction than the second cargo bed support bracket 15 that is located behind the first cargo bed support bracket 14. An inclination angle α of the virtual plane L with respect to a horizontal direction is 5° or smaller, preferably 3° or smaller.

As illustrated in FIG. 3, lower portions of the pair of left and right rear pole portions 24*b* of the ROPS 20 are detachably connected to side portions, in the vehicle width direction, of the ROPS mount 13 from outer sides thereof in the vehicle width direction via a pair of left and right ROPS attaching brackets 25.

As illustrated in the enlarged view in FIG. 3, each of the pair of left and right ROPS attaching brackets 25 has a chassis-side bracket 26 attached to the ROPS mount 13 and fourth cross members 27 that couple the chassis-side bracket 26 and the rear pole portion 24*b* in the vehicle width direction.

The chassis-side bracket 26 is a plate member having a hat-like cross section that is opened on an inner side thereof in the vehicle width direction and extends in the top-bottom direction from the ROPS mount 13 to the seat frame 12. The chassis-side bracket 26 is disposed so that the ROPS mount 13 is sandwiched in an inside of the hat-like cross section at an upper end thereof, and the chassis-side bracket 26 is fixed to the ROPS mount 13 in the front-rear direction by a fastening member inserted into the chassis-side bracket 26 and the ROPS mount 13 in the front-rear direction. A lower end of the chassis-side bracket 26 is fixed, at a flange portion 26*a* extending in the front-rear direction, to the seat frame 12 in the vehicle width direction by a fastening member.

The fourth cross members 27 are a pair of upper and lower pipe members that extend in parallel in the vehicle width direction. The pair of upper and lower fourth cross members 27 are configured such that ends thereof on an inner side in the vehicle width direction are fixed to the chassis-side bracket 26 by welding and ends thereof on an outer side in the vehicle width direction are fixed to the rear pole portion 24*b* by welding.

Furthermore, a third cargo bed support bracket 28 (cargo bed support portion) is attached to the ROPS attaching bracket 25 across the pair of upper and lower fourth cross members 27. The third cargo bed support bracket 28 is provided on each of the pair of left and right ROPS attaching brackets 25. That is, a pair of left and right third cargo bed support brackets 28 are provided. The third cargo bed support bracket 28 is located closer to the outer sides of the fourth cross members 27 in the vehicle width direction, i.e., located closer to the rear pole portion 24*b* and extends backward.

The third cargo bed support bracket 28 is a plate member having a rectangular cross section (u shape or channel shape) that is opened on a lower side thereof. The third cargo bed support bracket 28 has an upper surface portion 28*a* that extends backward from an upper one of the fourth cross members 27 and a pair of left and right side surface portions 28*b* that extend downward from side portions, in vehicle width direction, of the upper surface portion 28*a* and are coupled to the lower one of the fourth cross members 27.

The upper surface portion 28*a* has a first portion 28*a*1 that is connected to the upper one of the fourth cross members 27 and a second portion 28*a*2 that extends rearward in a substantially horizontal direction from a rear side of the first portion 28*a*1 and on which the cargo bed 30 is placed. The first portion 28*a*1 is inclined downward from the upper one of the fourth cross members 27 toward the rear side. Accordingly, the position of the second portion 28*a*2 in the top-bottom direction is located between the pair of upper and lower fourth cross members 27. The second portion 28*a*2 is inclined downward toward the rear side at a smaller inclination angle than the first portion 28*a*1 with respect to the horizontal direction. More specifically, the second portion 28*a*2 is located on the virtual plane L on which the upper surface portions 14*a* and 15*a* of the first and second cargo bed support brackets 14 and 15 are located, as illustrated in FIG. 4.

Each of the side surface portions 28*b* has a substantially triangular shape so that the width thereof in the top-bottom direction become smaller toward the rear side when viewed from the side face of the vehicle.

In the present embodiment, each of the first to third cargo bed support brackets 14, 15, and 28 is fixed to the main frames 11 or the fourth cross members 27 of the ROPS 20 by welding but may be, for example, detachably attached thereto by using a fastening member.

Figure 5:
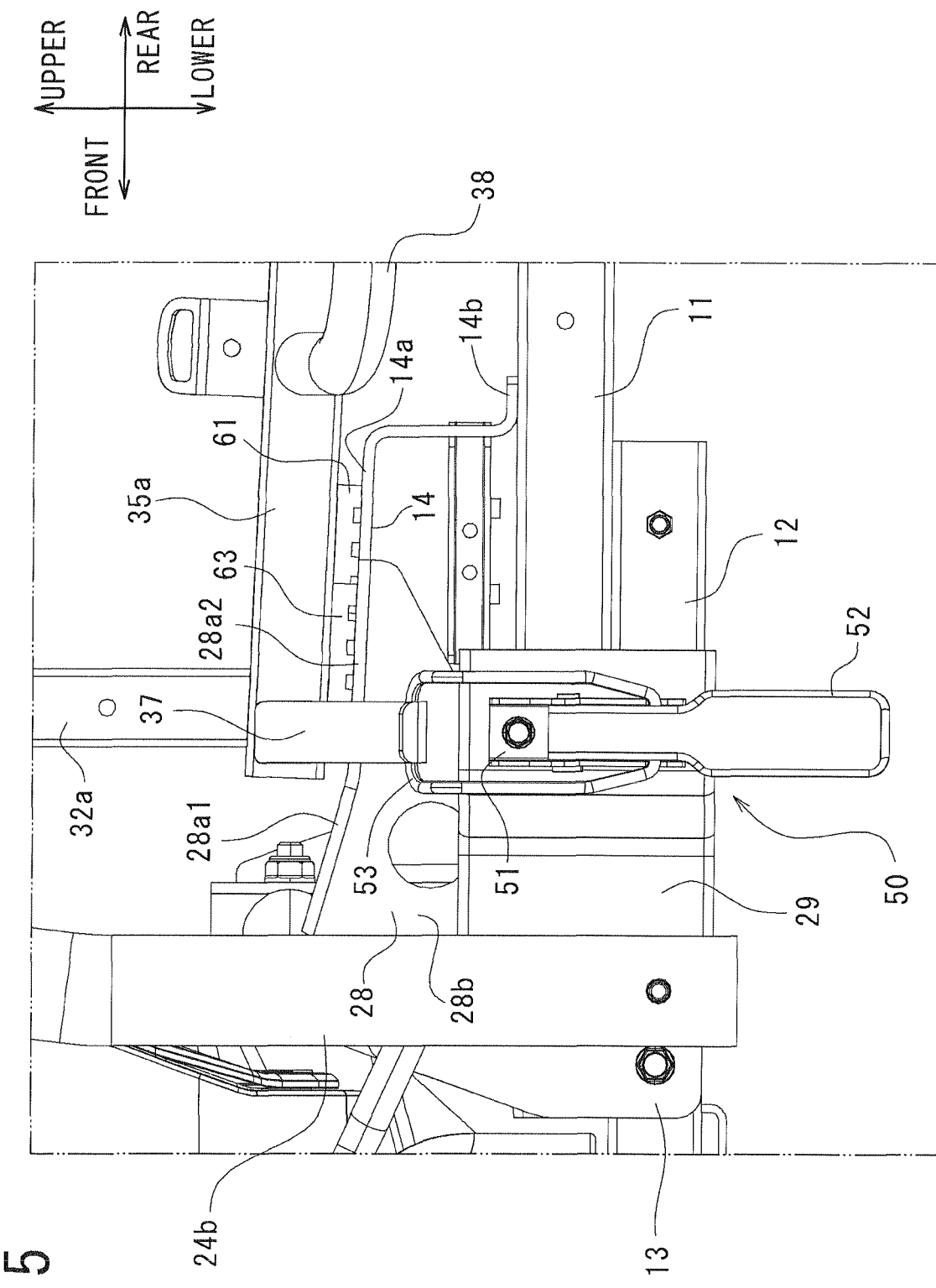
FIG. 5 is a left side enlarged view of a cargo bed locking unit and surroundings thereof.

FIG. 5 is an enlarged side view of a cargo bed locking unit 50 and surroundings thereof in a state where the cargo bed 30 is at the normal position. As illustrated in FIG. 5, a bracket 29 that extends backward is fixed to a lower end of the rear pole portion 24*b* of the ROPS 20 by welding. The cargo bed locking unit 50 is attached to the bracket 29 from an outer side thereof in the vehicle width direction. The cargo bed locking unit 50 is a lever-type toggle clamp and includes a base 51 attached to the bracket 29, a lever 52 whose upper portion is pivotably attached to the base 51, and a hook 53 whose lower end is pivotably attached to the lever 52.

The cargo bed 30 can be locked at the normal position by causing the lever 52 to turn downward while locking an upper end of the hook 53 to a hook receiver 37 provided on the cargo bed 30, in a state where the cargo bed 30 is at the normal position. At least part of the cargo bed locking unit 50 overlaps the third cargo bed support bracket 28 (more specifically, the second portion 28*a*2 of the upper surface portion 28*a*) when viewed from the side face of the vehicle.

Figure 6:
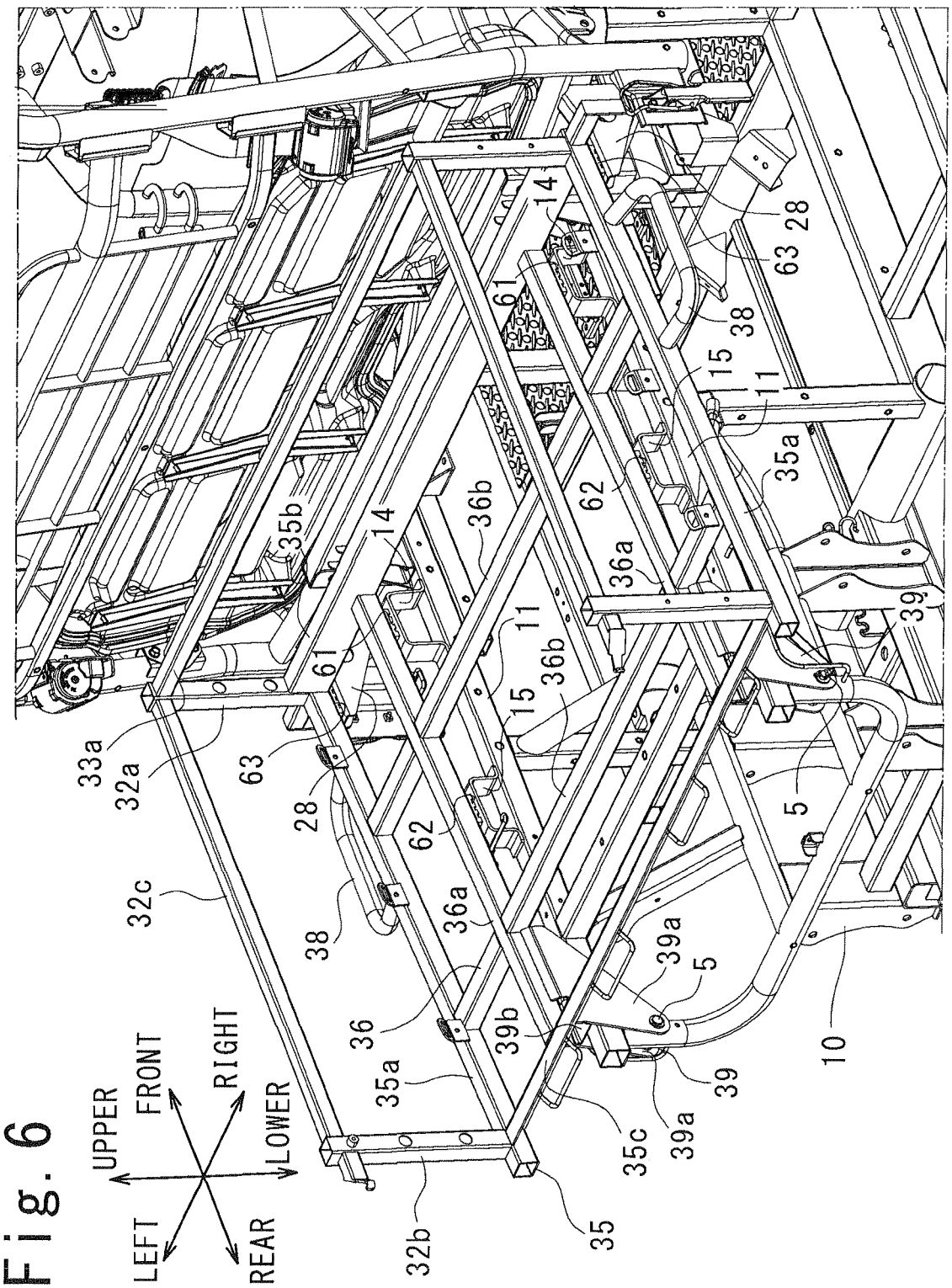
FIG. 6 is a perspective view of a frame part of the utility vehicle in a state where the cargo bed is at a normal position.

FIG. 6 is a perspective view illustrating a state where the cargo bed 30 is at the normal position and illustrates a frame part of the cargo bed 30. As illustrated in FIG. 6, the cargo bed 30 has, as frame parts of the bottom wall portion 31 (see FIG. 1), an outer frame portion 35 that constitutes a rectangular outer frame and an inner frame portion 36 that is a grid-like portion located inside the outer frame portion 35.

The outer frame portion 35 has a pair of left and right outer longitudinal frames 35*a* that extend in parallel with each other in the front-rear direction, a front outer lateral frame 35*b* that couples front ends of the pair of left and right outer longitudinal frames 35*a* in the vehicle width direction, and a rear outer lateral frame 35*c* that couples rear ends of the pair of left and right outer longitudinal frames 35*a* in the vehicle width direction. The outer longitudinal frames 35*a* are square pipes having a substantially square shaped cross section. The front outer lateral frame 35*b* is a square pipe having a rectangular cross section that is long in the top-bottom direction. The height of the cross section of the front outer lateral frame 35b is substantially two times as that of each of the outer longitudinal frames 35a. The rear outer lateral frame 35c is a member having an L-shaped cross section.

On each of the front ends of the outer longitudinal frames 35a, the hook receiver 37 is provided and extends downward from an end of a pipe member protruding outward in the vehicle width direction. The hook receiver 37 is disposed so that the hook 53 of the cargo bed locking unit 50 provided on the chassis 10 can be locked thereto, in a state where the cargo bed 30 is at the normal position. The hook receiver 37 is located at the same position in the front-rear direction as the cargo bed locking unit 50 so as to overlap the third cargo bed support bracket 28 (more specifically, the second portion 28a2 of the upper surface portion 28a) viewed from side, in the state where the cargo bed 30 is at the normal position (see also FIG. 5).

A grip portion 38 that is operated when the cargo bed 30 is performed a dumping action is provided on each of the outer longitudinal frames 35a. The grip portion 38 has a U shape that is opened on an inner side in the vehicle width direction in plan view.

The inner frame portion 36 has a pair of left and right inner longitudinal frames 36a that extend in parallel with each other in the front-rear direction and a pair of front and rear inner lateral frames 36b that extend in parallel with each other in the vehicle width direction. The inner longitudinal frames 36a couple the front outer lateral frame 35b and the rear outer lateral frame 35c in the front-rear direction. The inner lateral frames 36b couple the pair of left and right outer longitudinal frames 35a in the vehicle width direction. Both of the inner longitudinal frames 36a and the inner lateral frames 36b are square pipes having a substantially square cross section, and the height of the cross section is equal to that of the outer longitudinal frames 35a.

A pivot bracket 39 that extends downward is provided on a rear end of each of the pair of left and right inner longitudinal frames 36a. The pivot bracket 39 has a pair of left and right vertical wall portions 39a that extend downward so as to sandwich a corresponding one of the pair of left and right inner longitudinal frames 36a in the vehicle width direction and a coupling wall portion 39b that couples the pair of left and right vertical wall portions 39a in the vehicle width direction. The pivot shaft 5 is inserted in the vehicle width direction into lower ends of the vertical wall portions 39a of the pivot bracket 39.

In the state where the cargo bed 30 is at the normal position, the front end of each of the outer longitudinal frames 35a faces the second portion 28a2 of the upper surface portion 28a of the third cargo bed support bracket 28 from above, the inner longitudinal frames 36a face the upper surface portions 14a and 15a of the first and second cargo bed support brackets 14 and 15 fixed to the main frames 11 from above, and the coupling wall portion 39b of the pivot bracket 39 faces the rear end of each of the pair of left and right main frames 11 from above.

First and second elastic members 61 and 62 are attached to portions of each of the inner longitudinal frames 36a that correspond to the first and second cargo bed support brackets 14 and 15, respectively. A third elastic member 63 is attached to a portion of each of the outer longitudinal frames 35a that corresponds to the third cargo bed support bracket 28. A fourth elastic member 64 (see FIG. 4) is attached to the coupling wall portion 39b of the pivot bracket 39. Each of the first to fourth elastic members 61 to 64 is a member that has elasticity such as rubber and is attached to lower portions of the outer longitudinal frames 35a, the inner longitudinal frames 36a, or the coupling wall portions 39b of the pivot brackets 39 by using appropriate joining means such as an adhesive and/or insertion.

The outer frame portion 35 and the inner frame portion 36 are disposed so that lower surfaces thereof are located on the same plane, and the outer longitudinal frames 35a, the inner longitudinal frames 36a, and the inner lateral frames 36b are disposed so that upper surfaces thereof are located on the same plane. A bottom plate 31a (see FIG. 1) is attached onto an upper side of the inner frame portion 36 so as to form the bottom wall portion 31 of the cargo bed 30. The bottom plate 31a has no drainage hole that passes therethrough in the top-bottom direction, and the engine room E and a space above the cargo bed 30 are separated by the bottom wall portion 31.

Cargo bed front poles 32a and cargo bed rear poles 32b that extend upward are provided on front ends and rear ends of the pair of left and right outer longitudinal frames 35a, respectively. Cargo bed rails 32c that couple the cargo bed front poles 32a and the cargo bed rear poles 32b in the front-rear direction are further provided on upper ends of the cargo bed front poles 32a and the cargo bed rear poles 32b. The cargo bed front poles 32a, the cargo bed rear poles 32b, and the cargo bed rails 32c constitute a frame part of the side wall portions 32. The cargo bed rails 32c are exposed above the side cover 9 (see also FIG. 1). A front wall upper pole 33a is provided between the pair of left and right cargo bed front poles 32a.

In the state where the cargo bed 30 is at the normal position, the front ends and substantially central portions, in the front-rear direction, of the pair of left and right inner longitudinal frames 36a are supported by the first and second cargo bed support brackets 14 and 15 attached to the main frames 11 via the first and second elastic members 61 and 62, and the rear ends of the pair of left and right inner longitudinal frames 36a are supported by the rear ends of the main frames 11 via the fourth elastic members 64. Furthermore, ends, in the vehicle width direction, of front portions of the cargo bed 30 are supported by the third cargo bed support brackets 28 via the third elastic members 63.

In this state, the upper surface portions 14a, 15a, and 28a2 of the first to third cargo bed support brackets 14, 15, and 28 that support the cargo bed 30 are located on the virtual plane L, and the virtual plane L is inclined downward toward the rear side, as illustrated in FIG. 4. Accordingly, the bottom wall portion 31 of the cargo bed 30 at the normal position is inclined downward toward the rear side along the virtual plane L. As illustrated in the enlarged view in FIG. 4, a gap C is present between the bottom wall portion 31 and the rear wall portion 34.

The height of the cargo bed rear poles 32b is higher than that of the cargo bed front poles 32a by an amount of height by which the bottom plate 31a is lowered due to the downward inclination toward the rear side. Accordingly, the bottom wall portion 31 is inclined downward toward the rear side, whereas the cargo bed rails 32c extend substantially horizontally in an anteroposterior direction in the state where the cargo bed 30 is at the normal position.

The utility vehicle 1 according to the above embodiment produces the following effects.

(1) As illustrated in FIG. 6, the left and right side portions of the cargo bed 30 that protrude from the main frames 11 in the vehicle width direction are supported by the third cargo bed support brackets 28. This improves support rigidity, in the vehicle width direction, of the cargo bed 30 at the normal position. Furthermore, the rigidity of the third cargo bed support brackets 28 is high since the third cargo bed support brackets 28 are attached to the ROPS 20 having high rigidity. This further improves the support rigidity of the cargo bed 30. By increasing the support rigidity of the cargo bed 30 in the left-right direction, it is therefore possible to improve the rigidity of the cargo bed 30 at the normal position without increasing the rigidity of the cargo bed 30 itself. It is therefore possible to improve the rigidity of the cargo bed 30 at the normal position, especially the rigidity of the cargo bed 30 in the vehicle width direction while keeping an increase of the weight of the cargo bed 30 small.

(2) The third cargo bed support bracket 28 is attached across the pair of upper and lower fourth cross members 27, as illustrated in FIG. 3. This allows the third cargo bed support bracket 28 to bear load in the top-bottom direction. Furthermore, the third cargo bed support bracket 28 itself, which has a rectangular cross section that is opened on a lower side thereof, has high rigidity in the top-bottom direction. Therefore, the third cargo bed support bracket 28 further improves the support rigidity of the cargo bed 30.

(3) As illustrated in FIG. 5, the cargo bed locking unit 50 overlaps the second portion 28a2, on which the cargo bed 30 is supported, of the third cargo bed support bracket 28 when viewed from the side face of the vehicle. Furthermore, the third cargo bed support bracket 28 is close to the rear pole portion 24b of the ROPS 20 in the vehicle width direction, and the cargo bed locking unit 50 is attached to the rear pole portion 24b via the bracket 29. That is, the cargo bed locking unit 50 is disposed close to the third cargo bed support bracket 28 in the vehicle width direction.

As a result, the left and right side portions of the front portion of the cargo bed 30, which has increased support rigidity due to the third cargo bed support bracket 28, can be stably locked. Furthermore, load of locking of the hook 53 and the hook receiver 37 is suitably supported by the third cargo bed support bracket 28 located close to the hook 53 and the hook receiver 37. This makes it possible to firmly fix the cargo bed 30 at the normal position.

(4) Since the left and right side portions of the front portion of the cargo bed 30 are fixed by the pair of left and right cargo bed locking units 50, the cargo bed 30 can be fixed at the normal position in a well-balanced manner in the left-right direction.

(5) As illustrated in FIG. 4, the bottom wall portion 31 is inclined downward toward the rear side in the state where the cargo bed 30 is at the normal position. This allows foreign substances such as rainwater that infiltrate onto the bottom plate 31a of the cargo bed 30 to be guided backward, thereby preventing such foreign substances from infiltrating into the riding space S located ahead of the cargo bed 30 or into the engine room E located below the cargo bed 30. This makes it possible to prevent formation of a water puddle on the cargo bed 30 without the need for formation of a drainage hole in the bottom plate 31a.

(6) Since the side cover 9 that covers the side wall portions 32 of the cargo bed 30 extends substantially horizontally in an anteroposterior direction, the side cover 9 can make the backward inclining of the bottom wall portion 31 of the cargo bed 30 less noticeable. It is therefore possible to prevent appearance of the vehicle from being deteriorated by the backward inclining of the bottom wall portion 31. In addition, the cargo bed rails 32c exposed above the side cover 9 also extend substantially horizontally in an anteroposterior direction and therefore allows the backward inclining of the bottom wall portion 31 to be further less noticeable.

Furthermore, since the inclination angle α of the bottom wall portion 31 of the cargo bed 30 is set to 5 degrees or smaller, more preferably 3 degrees or smaller with respect to the horizontal direction, the backward inclining of the bottom wall portion 31 is made further less noticeable.

(7) Since the gap C is present between the bottom wall portion 31 and the rear wall portion 34 of the cargo bed 30, foreign substances such as rainwater guided backward on the bottom plate 31a can be discharged from the cargo bed 30 through the gap C.

(8) It is possible to prevent foreign substances such as rainwater that infiltrate onto the cargo bed 30 from adhering onto the engine 70 and the transmission 71 installed in the engine room E located below the cargo bed 30.

What is claimed is:

1. An utility vehicle comprising:
   a chassis;
   a ROPS that surrounds a riding space;
   a cargo bed that is disposed behind the riding space and is pivotably supported by a pivot of the chassis so as to be movable up and down between a normal position at which a front portion of the cargo bed is not lifted and is supported on the chassis and a dumping position at which the front portion of the cargo bed is lifted; and
   a pair of left and right cargo bed support portions that are fixed to the ROPS, extend backward, and support lower surfaces of side portions of the front portion of the cargo bed at the normal position from below.

2. The utility vehicle according to claim 1, wherein
   the ROPS has a pair of upper and lower cross members that extend in a vehicle width direction behind the riding space, and
   the cargo bed support portions are fixed to and extend across the pair of upper and lower cross members.

3. The utility vehicle according to claim 1, further comprising a first cargo bed locking unit that fixes the cargo bed at the normal position to the chassis,
   the first cargo bed locking unit having a hook receiver that is provided on one of the side portions of the cargo bed and a hook that is provided on the chassis and is configured to be capable of being locked to the hook receiver, and
   at least part of the first cargo bed locking unit overlaps the cargo bed support portions when viewed from a side face of the utility vehicle.

4. The utility vehicle according to claim 3, wherein a second cargo bed locking unit is provided on the other of the side portions of the cargo bed.

* * * * *